Dec. 21, 1926.
T. S. MOFFETT
TUG HOOK
Filed Feb. 23, 1926
1,611,663
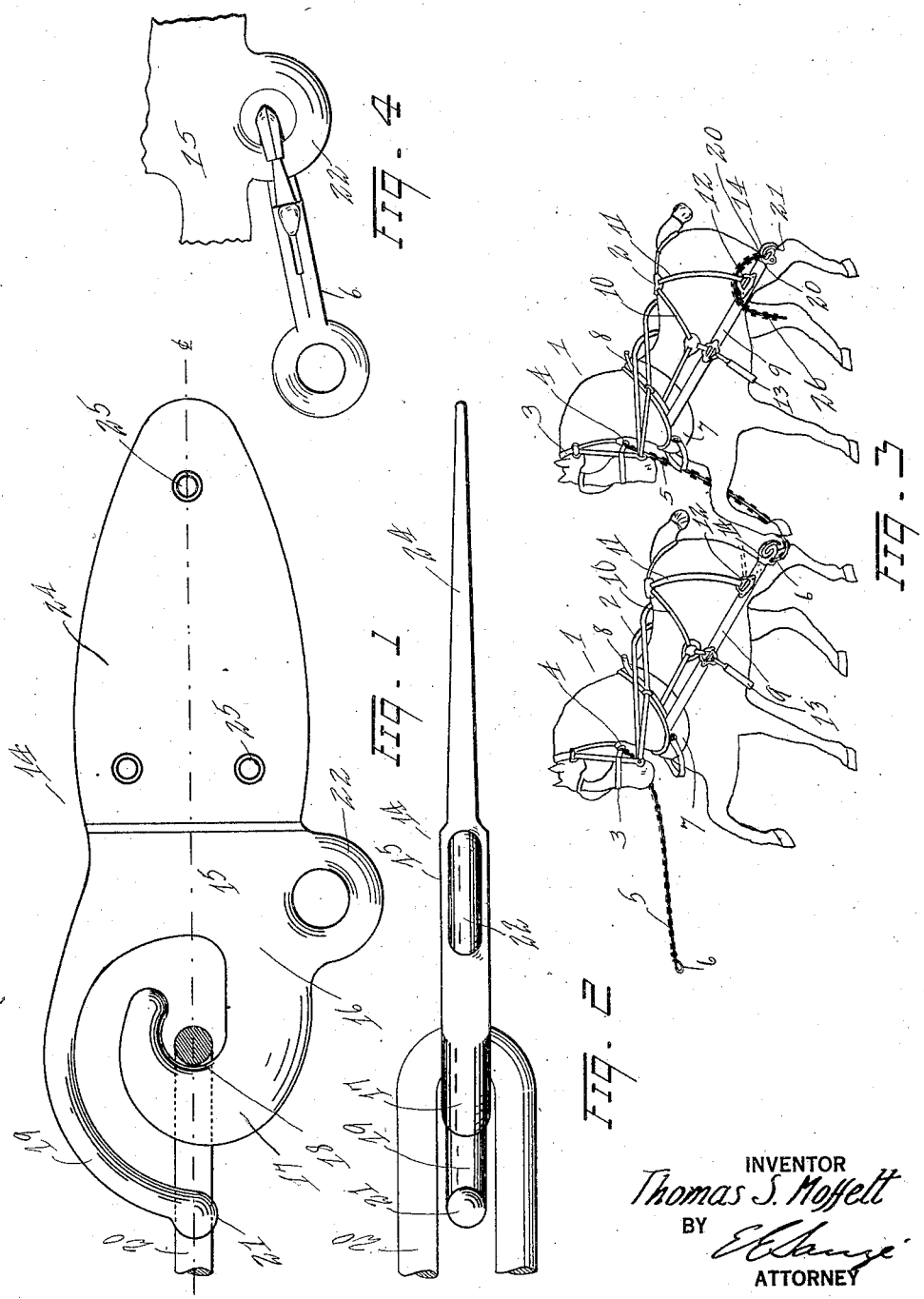
INVENTOR
Thomas S. Moffett
BY
ATTORNEY Patented Dec. 21, 1926.

1,611,663

UNITED STATES PATENT OFFICE.

THOMAS S. MOFFETT, OF WALLA WALLA, WASHINGTON.

TUG HOOK.

Application filed February 23, 1926. Serial No. 89,829.

This invention relates to tug hooks and has as one of its objects to provide a hook that will act to protect harness from being broken.

Another object of this invention is to provide a tug hook that is arranged so that the connecting link of the butt chain will close and protect the hook from catching on parts of harness of an adjacent horse.

A further object of this invention is to provide a tug hook that is cheap to manufacture and that has great strength.

With these and other objects in view reference is had to the accompanying drawings in which:

Fig. 1 is a side elevation of the device, in full size;

Fig. 2 is a plan view from below of the device;

Fig. 3 shows one application of the device, and

Fig. 4 shows the snap hook of the butt chain caught in the ring of said tug hook.

Having reference to the drawings like numerals refer to like parts throughout the several views, and the numeral 1 refers to horses equipped with harness 2, said harness consisting in part of a halter bridle 3, provided with a leading ring 4, and a halter chain 5, carrying a snap 6, a collar 7, hames 8, to which are attached tugs 9, a back strap 10, and a hip strap 11, to support said tugs 9, and a belly band 13, the hip strap being attached to the tugs 9 by harness links 12.

Attached to the lower end of each of the tugs 9, is a tug hook 14, which forms the subject of my invention, and this tug hook consists of a body 15, that is of a generally flat nature, as shown in Fig. 2.

Extending from and formed integral with said body 15, is a shank 16, that is upturned on its end to form a hook 17, and positioned with relation to the body so that the throat 18, of said hook is on the center line of the tug hook, for a purpose to be explained.

Integral with and extending from the top of said body 15, is a guard 19, and the guard is formed concentric with said hook 17, and at a distance therefrom to provide for the passage of an elongated link 20, between said guard and hook to engage the throat 18, of said hook.

The end 21, of said guard terminates on the center line and opposite said hook in a relation to each other so that said elongated link 20, will cover the said end 21, when the tug 9, is under a tension, as when the team is at work.

At the juncture of the hook 17, and the body 15, and formed integral with said body is a ring 22, arranged to depend from the body to provide ample material at said juncture to maintain the strength of the hook, and provides a means to which may be attached the halter chain 5, that may be snapped thereinto by means of the snap 6, as shown in Fig. 4.

Attached to and also formed integral with the body is a fin shaped means 24, for attaching the tug hook to the tug, which attachment is accomplished in the usual manner by stitching and by riveting through the holes 25, shown in Fig. 1, and placed therein for the purpose.

In use the tug hook is attached to and made a part of the tug of the harness, and the usual butt chains 26, carrying the link 20, are hooked into the tug hook. The harness is placed on the draft animals and they are led to the work to which they are attached by the butt chain, in a manner not shown as it is well known.

Now in drawing the vehicle or implement it is not uncommon for one horse to lag behind another and, when urged, to spring forward to his place beside the companion animal. When one animal lags back obviously his harness is slack, and is flapping about to catch on any projections carried by the other harness.

Then with the pulling animal in the lead, and the lagging animal in the rear, when spoken to the lagging animal rushes ahead with a force that pulls the pulling animal back, and in this whip-saw movement and with any portion of the harness caught in the adjacent harness, some part of the adjacent harness must break under the enormous strain occurring.

With the guarded tug hook the link 20, is always in place over the end of the guard when the horse is pulling, and hence when the lagging animal lunges forward there is no projection on which to catch and no breakage can occur.

Now in leading the animals from the work it is the common practice to snap the halter chain in the harness link 12, that joins the hip strap 11, with the tug 9, in the position represented by the dotted lines in Fig. 3, in which manner two, four or eight horses can be led by one person and can enter the barn through an ordinary size door. In this case it is obvious that any sudden strain put upon the harness link 12, would break the harness at this point, as the link is not intended to stand this extra strain.

Conversely the tug is designed to withstand severe duty and by the addition of the ring 22, to the tug hook, a simple means is provided whereby the animals can be joined together with the halter chain 5, for leading purposes, without the danger of breakage due to a fractious or frightened animal or animals.

Having thus described my invention, I claim—

In a tug hook, a body, a shank formed integral with and extended from said body and terminating in a hook, a guard formed integral with said body and extended concentrically with said hook and positioned with its end positioned opposite said hook, a ring formed integral with said body and positioned at the juncture of said body and said shank, and in such a manner that the opening enclosed by the ring is disposed substantially below the shank of the hook so as not to impair the strength of said hook, and means to attach said body to a tug.

In testimony whereof I affix my signature.

THOMAS S. MOFFETT.